United States Patent [19]

Frye

[11] 4,157,739
[45] Jun. 12, 1979

[54] MOTORCYCLE

[76] Inventor: Norman V. Frye, Rte. #4, Davenport, Iowa 52804

[21] Appl. No.: 795,578

[22] Filed: May 10, 1977

Related U.S. Application Data

[62] Division of Ser. No. 677,911, Apr. 19, 1976, abandoned.

[51] Int. Cl.² ............................................. B62D 61/02
[52] U.S. Cl. .................................... 180/33 R; 180/31; 280/269; 280/281 B; 296/78.1
[58] Field of Search ............... 180/30, 31, 32, 33 R, 180/33 A, 33 B, 33 C, 33 D, 34, 35; 280/281 B, 267, 288, 269; 297/195; 296/78.1

[56] References Cited

U.S. PATENT DOCUMENTS

| 509,919 | 12/1893 | Libbey | 180/33 |
|---|---|---|---|
| 1,430,938 | 10/1922 | Caluignac | 180/35 |
| 2,035,462 | 3/1936 | Courtney | 280/281 B |
| 2,792,899 | 5/1957 | Piatti | 180/33 R |
| 3,554,311 | 1/1971 | Thompson | 280/281 B |
| 3,603,609 | 9/1971 | Hott | 297/195 X |
| 3,642,083 | 2/1972 | Rodler | 180/31 |

FOREIGN PATENT DOCUMENTS

| 946279 | 7/1956 | Fed. Rep. of Germany | 180/33 R |
|---|---|---|---|
| 1944286 | 3/1971 | Fed. Rep. of Germany | 280/281 B |
| 1006571 | 4/1952 | France | 180/33 R |
| 1171618 | 1/1959 | France | 296/78.1 |
| 227062 | 5/1943 | Switzerland | 180/35 |
| 138714 | 2/1920 | United Kingdom | 180/30 |
| 158101 | 1/1921 | United Kingdom | 180/33 R |
| 817539 | 7/1959 | United Kingdom | 280/267 |
| 1269491 | 4/1972 | United Kingdom | 296/78.1 |

*Primary Examiner*—John P. Silverstrim
*Attorney, Agent, or Firm*—Henderson & Sturm

[57] ABSTRACT

A pair of elongated, parallel tubes. A frame is formed by transverse members joining the tubes at each end thereof. Wheels are affixed to each end of the frame and are interconnected by tie rod structures such that the wheels operate together as a steering mechanism, each wheel turning in the opposite direction of the other wheel. A cover is attached over the frame, and, together with front and rear fender members attached to the frame adjacent the ends of the frame, forms a cavity. A motor is mounted within the cavity and drives a hydraulic pump. The pump drives hydraulic motors mounted in the hubs of the wheels.

4 Claims, 5 Drawing Figures

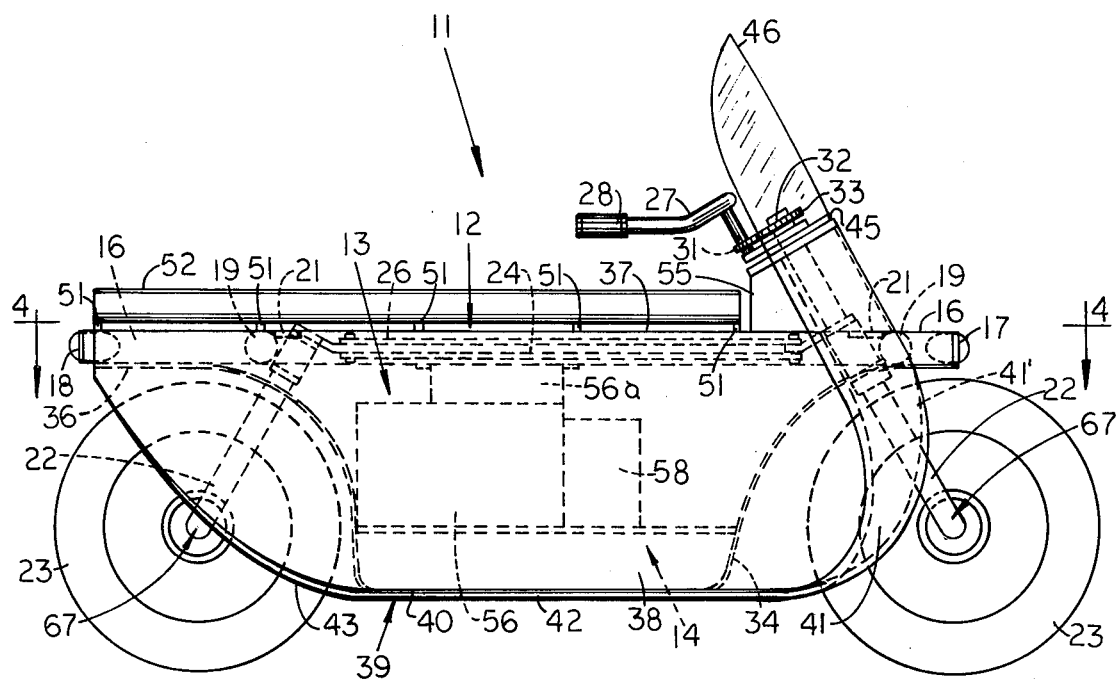
FIG. 1
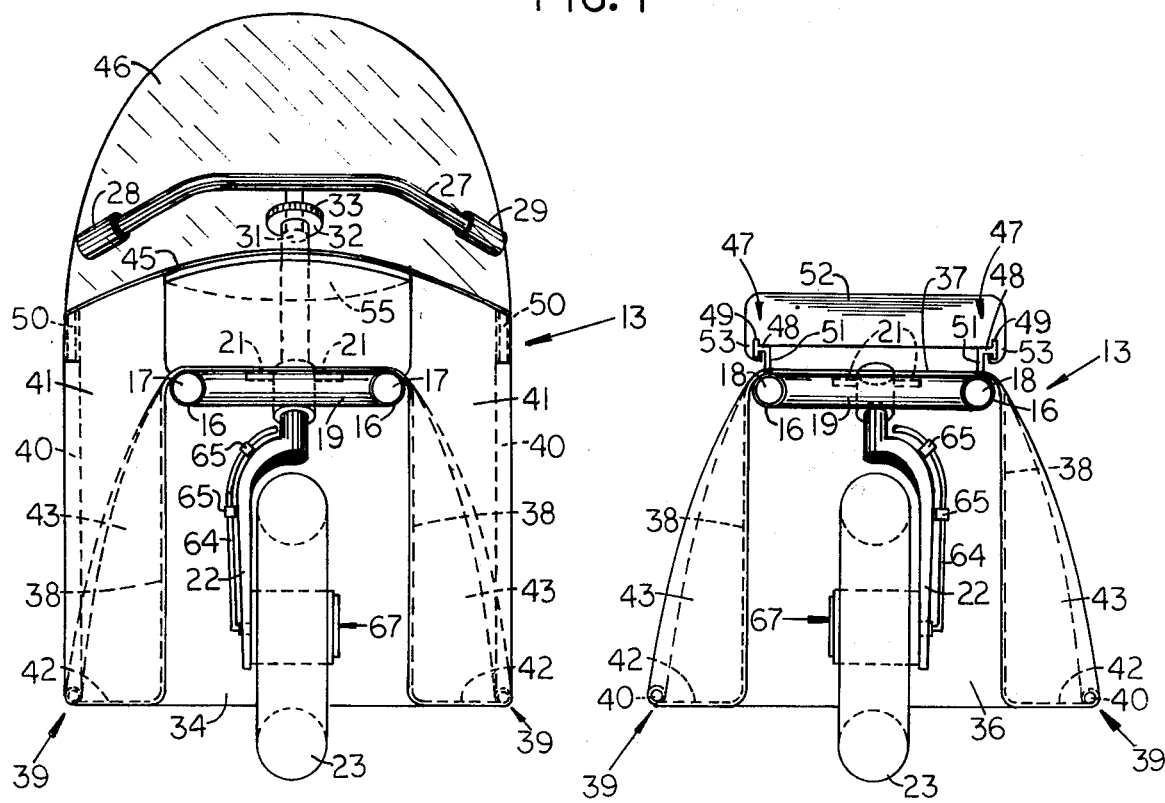
FIG. 2
FIG. 3

MOTORCYCLE

This is a division of application Serial No. 677,911 filed April 19, 1976 now abandoned.

BACKGROUND OF THE INVENTION

This invention relates to self-powered, wheeled vehicles. More particularly, this invention relates to such vehicles which have two wheels and are commonly called motorcycles.

A number of farm tractors have been developed which have self-tracking steering, where the front wheels turn one way and the rear wheels the opposite way, and which also have four-wheel drive. Bicycles have been developed which have self-tracking steering. A successful motorcycle has not yet been constructed having self-tracking steering and having both wheels powered, particularly where the wheels are powered by a hydraulic drive mechanism. Tractor technology is not applicable due to the lack of the balance problem present with a motorcycle.

Ordinary motorcycles employ the front wheel for steering purposes and the rear wheel for drive purposes. The conventional motorcycle is somewhat unstable due to the rear wheel crossing or jumping over ruts made by the front wheel. Where one tire is for steering and one for power, one tire may upset the functioning of the other. Powering of the motorcycle may upset the steering of the motorcycle and vice-versa, thereby resulting in an unstable vehicle.

SUMMARY OF THE INVENTION

A motorcycle has a frame assembly, a cover mechanism and a drive mechanism. The frame assembly includes a connected pair of parallel, elongated main members. The forks bearing the wheels are attached to the joined main members, one adjacent each end of the main members. Articulated tie rod members disposed between the main members interconnect the forks bearing the wheels. Fender well members are attached to the main members, one adjacent each end of the main members, and the wheels are disposed within the fender well members.

The cover mechanism is a continuously formed structure and is fitted over the frame assembly. The cover has a generally horizontal top portion with side members depending from the longitudinal edges of the top portion. Continuous runner members are formed at the bottom edges of the side members. An air cavity is formed by the inwardly facing surfaces of the top portion, side members and fender well members.

The drive mechanism includes an internal combustion engine mounted within the air cavity. The engine is coupled to a hydraulic drive, a hydraulic pump being driven by the engine. The pump is connected to bi-directional hydraulic motors. Each of the hydraulic motors are located in the hub of a wheel and drive that wheel.

It is an object of this invention to provide a motorcycle which may be easily balanced when moving in a reverse or backwards direction.

Another object of this invention is to provide a motorcycle having improved maneuverability and superior cornering capabilities.

A further object of this invention is to provide a motorcycle having superior traction in adverse weather conditions and having the ability to ford substantial bodies of water and to travel over rugged terrain.

Still another object of this invention is to provide a motorcycle with improved safety features whereby the legs of the rider(s) are afforded increased protection, and with improved shielding characteristics whereby working parts are not exposed to external weather conditions thereby resulting in greater durability.

Another object of this invention is to provide a motorcycle which is adaptable to carry several riders in a variety of positions or variable amounts and types of freight.

It is also an object of this invention to provide a motorcycle suitable for military applications.

A further object of this invention is to provide a motorcycle wherein each wheel exercises half the function of steering and half the function of powering the motorcycle, thereby increasing the stability of the motorcycle.

Yet another object of this invention is to provide a motorcycle having the novel combination of a steering mechanism whereby both wheels steer in a self-tracking manner, a drive mechanism whereby both wheels are powered by hydraulic motors of a hydraulic drive, and a cover or body, and being capable of achieving the aforementioned objects.

These objects and other features and advantages of the motorcycle of this invention will become readily apparent upon referring to the following description, when taken in conjunction with the appended drawings.

BRIEF DESCRIPTION OF THE DRAWING

The motorcycle of this invention is illustrated in the drawing wherein:

FIG. 1 is a side elevational view of the motorcycle, internal structures of the motorcycle being shown by hatched lines;

FIG. 2 is a front elevational view of the motorcycle;

FIG. 3 is a rear elevational view of the motorcycle with the front half of the motorcycle cut away for greater clarity;

DESCRIPTION OF THE PREFERRED EMBODIMENT

Figure 4:
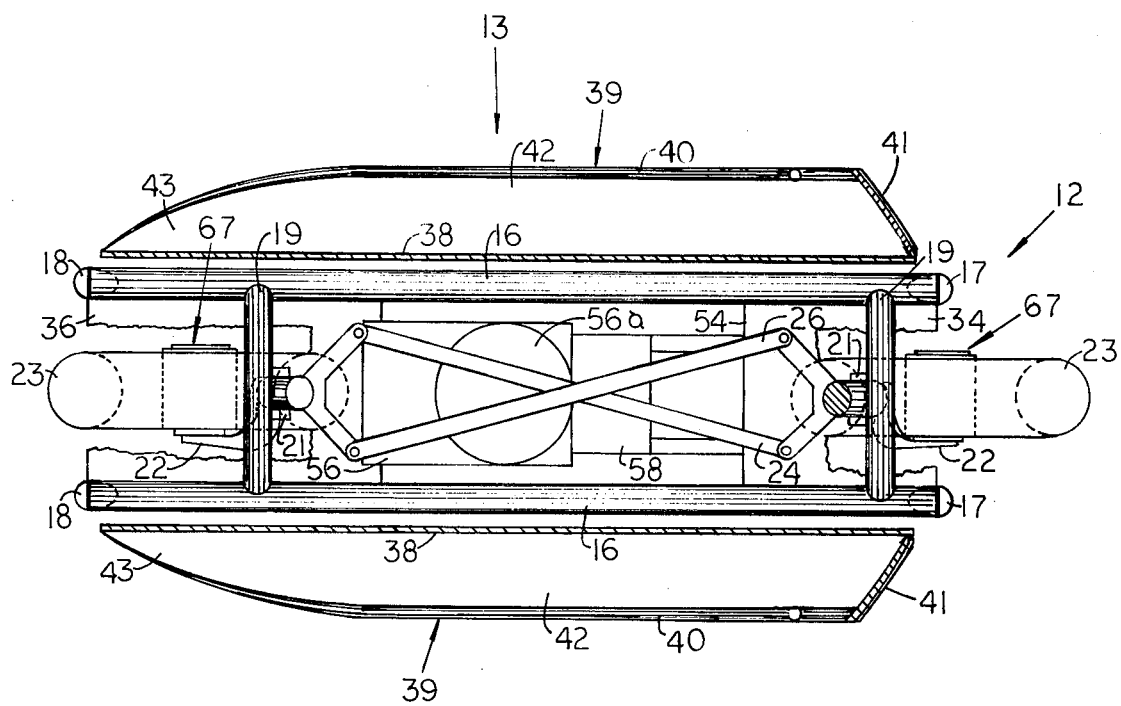
FIG. 4 is a horizontal sectional view taken along line 4—4 in FIG. 1, the console being cut away and the fender well members being partially cut away for greater clarity.

The motorcycle of this invention is indicated generally at 11 in FIG. 1. The motorcycle 11 includes a frame assembly 12, a cover mechanism 13 and a drive mechanism 14. The drive mechamism 14 is attached to the frame assembly 13, and the cover mechanism 13 fits over and rests upon the frame assembly 12 and substantially encloses the drive mechanism 14.

More particularly the frame assembly 12, most clearly shown in FIG. 4, includes a pair of main frame members 16. The main members 16 are parallel, elongated and hollow. A neoprene sack (not shown) is disposed within each of the main members 16, one sack (not shown) acting as a gas tank or reservoir, and the other sack (not shown in FIGS. 1–4) acting as a reservoir or sump (63 in FIG. 5) for hydraulic fluid or oil. Attached within the front ends of the main members 16 and extending therefrom are headlights 17. Similarly attached to the rear ends of the main members 16 are tail lights 18. Two transverse members 19 join the main members 16, one member 19 joining the members 16 adjacent the front end of the assembly 12 and the other member 19 joining the members 16 adjacent the rear of the assembly 12.

A mounting member 21, shown in FIG. 4, is attached to each of the transverse members 19, and fork structures 22 bearing wheels 23 are rotatably received by the mounting members 21. Right and left articulated tie rod members 24, 26 are attached between the forks 22. The tie rods 24, 26 cross over to form an X shape when viewed in plan. The right tie rod 24 is attached between the right side of the front fork 22 and the left side of the rear fork 22, and the left tie rod 26 is attached between the left side of the front fork 22 and the right side of the rear fork 22.

A handle bar 27 (FIGS. 1 and 2) includes a throttle 28 and valve 29. At the lower end thereof, the handle bar 27 terminates in a sprocket member 31, shown in FIG. 4. A second sprocket member 32 is attached to the upper end of the front fork structure 22. A chain 33 is attached over the sprockets 31, 32. The sprockets 31, 32 are of different sizes, the ratio of the sprocket 32 to the sprocket 31 being somewhere between $1\frac{1}{4}$ to 1 and 3 to 1 with perhaps 2 to 1 being the preferable ratio.

Front and rear fender well members 34, 36, shown best in FIGS. 1 and 4, are attached to the main members 16 adjacent the front and rear ends of the frame 12 and curve inwardly, toward the center of the motorcycle 11, and downwardly therefrom. The fork structures 22 pass through the fender well members 34, 36, and the wheels 23 are disposed on the concave sides of the well members 34, 36.

The cover mechanism 13 (FIGS. 1-4) includes an elongated top portion 37 which is substantially horizontal and which has apertures or ducts (not shows) formed therethrough. Vertical side portions 38 (FIG. 1) depend from the longitudinal edges of the top 37. The sides 38 have roughly the shape of a parallelogram when the cover 13 is viewed from a side elevation. At the lower edges of the sides 38 are formed runner members 39.

Each runner member 39 includes contiguous forward, central and rear portions 41, 42, 43. The portions 41, 42, 43 are joined normal to the side 38 and extend outwardly therefrom, having a contiguous bead 40 formed at the outwardly disposed edges thereof. The rear portion 43 of each runner 39 is arcuate in conformation, the outwardly curved surface thereof being directed rearward and the inwardly curved surface thereof being directed forward. As shown in FIGS. 2, 3 and 4, the rear portion 43 is tapered, the width thereof progressively narrowing as the portion 43 curves upwardly. The central portion 42 is continuous with the portion 43 and is substantially flat (FIG. 1). The portion 42 is substantially rectangular in conformation when viewed in plan, as shown in FIG. 4.

The forward portion 41 of each runner member 39 is continuous with the central portion 42 thereof. The portion 41, as shown in FIG. 4, sweeps rearwardly as it extends outwardly from the side 38. The portion 41 also curves upwardly from the portion 42, as shown in FIG. 1, the inwardly curved surface thereof being directed rearward and the outwardly curved surface thereof being directed forward. The distance between the sides 38 and the outer edges of the portions 41 remains constant and the same as the width of the central portion 42, as shown in FIG. 3. At the upper ends thereof the forward portions 41 are connected, passing over and resting upon the forward end of the top portion 37.

A transverse groove 45 (FIG. 2) is formed in the top edge of the forward portions 41. A windshield 46 having attached posts 50 is fitted onto the forward portions 41, the posts 50 being received by the beads 40 and the lower edge of the windshield 46 being received by the groove 45.

Parallel attaching extrusion rails 47 (FIG. 3) are connected to the top portion 37 parallel to and adjacent the longitudinal edges of the top 37. The rails 47 have horizontal and vertical portions 48, 49 which are formed normal to each other. The rails 47 are attached to the top portion 37 by a plurality of supports 51. The supports 51 are attached to the top portion 37, adjacent the longitudinal edges of the top portion 37, and are attached to the horizontal portions 48 of the rails 47. The rails 47 are T-shaped in cross-section, and, when properly affixed to the portion 37, the rails 47 appear in end elevation (FIG. 3) as capital T's disposed on their sides. The horizontal portions 48 of the rails 47 are disposed adjacent the space between the rails 47, and the vertical portions 49 of the rails 47 are disposed away from the space between the rails 47. The portions 48 are parallel to, and the portions 49 perpendicular to the top 37. An elongated seat or cushion 52 having appropriately formed flanges 53 is slidably received by the rails 47. The upper surface of the seat 52 is curved such that a smooth, arcuate surface is defined together with the sides 38. Other forms (not shown) of seats, seat back supports, luggage or freight supports, or handholds, having appropriately formed flanges, may be received upon the rails 47 in place of or in addition to the seat 52.

The cover 13 when attached to the frame assembly 12 drapes over the assembly 12. As shown in FIGS. 1, 2 and 3, the cover 13 rests upon the main frame members 16, the top 37 being upon the members 16 and the sides 38 being against the sides of the members 16. The upper edges of the fender well members 34, 36 meet the underside of the top 37. The arcuate side edges of the members 34, 36 meet the sides 38. An air cavity 54 is thereby formed in the center of the motorcycle 11. The wheels 23 are partially disposed in cavities formed by the well members 34, 36 and the sides 38 of the cover 13. A control console 55 is attached, through an aperture formed in the top portion 37 of the cover 13 between the rails 37 and bead 45, to the main members 16. The handle bar 27 passes through the console 55 and therefore the top 37.

Figure 5:
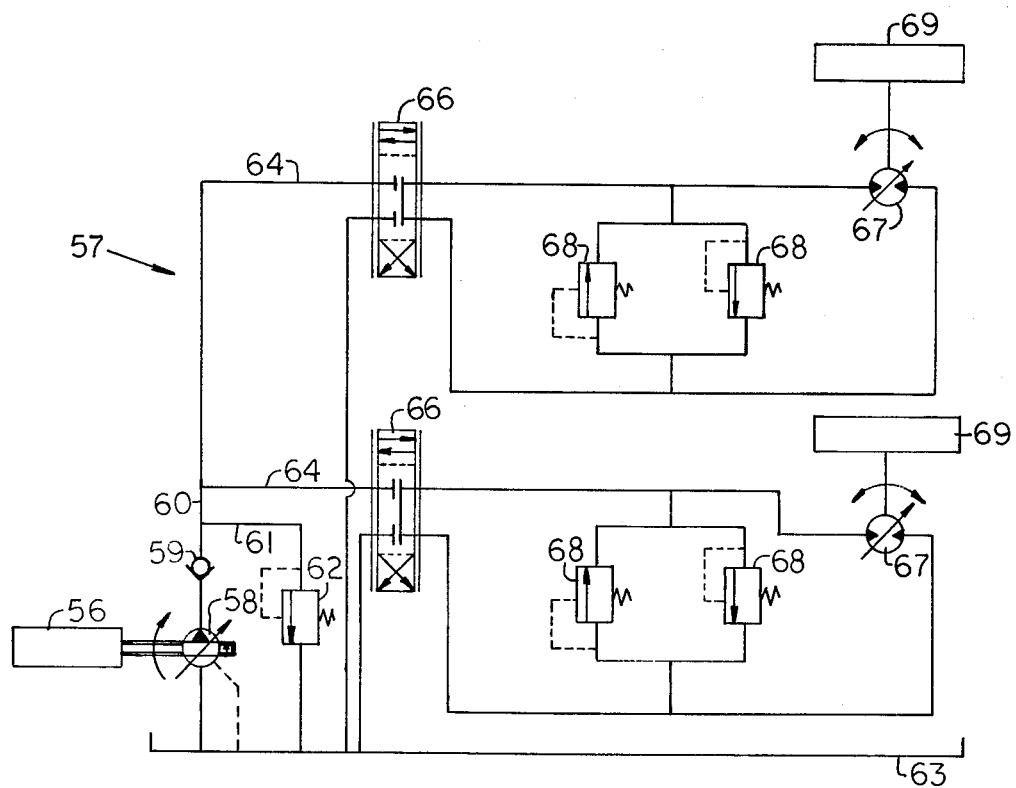
FIG. 5 is a schematic diagram of the drive mechanism showing the hydraulic drive portion thereof.

The drive mechanism 14 includes an internal combustion engine 56 (FIGS. 1, 4 and 5) and a hydraulic drive 57 (FIG. 5). The engine 56 is attached to the main members 16 of the frame 12 and rests against the inner, convex surfaces of the fender well members 34, 36. A cowl and ductwork 56a, FIG. 1, are fluid-connected to the apertures (not shown) of the top portions 37. The cavity 54 communicates with the outside through the apertures or ducts (not shown) of the top 37 and the cowl and ductwork 56a, and also through the large aperture (FIG. 4) formed by the fender well members 34, 36 and the sides 38.

The engine 56 drives a pressure compensated, variable volume, unidirectional hydraulic piston pump 58; however, other types of pumps may be used instead. A check valve 59 is downstream of the pump 58. The hydraulic fluid is carried from the pump 58, through the valve 59, by the line 60. A line 61 leads from line 60 through a hydraulic relief valve 62 to the sump or reservoir 63 to prevent dangerous overpressurization within the hydraulic drive 57. The line 60 branches into two lines 64. The lines 64 are partially shown in FIGS. 2 and 3 held by clips 65 to the forks 22. Each line 64 supplies hydraulic fluid, through infinite position, four-way directional control valves 66, to variable displacement-bidirectional hydraulic motors 67. The motors 67 are positioned within the hubs of the tires 23 (FIGS. 2 and 3) and drive the wheels 23 through a planetary gear train (not shown). Hydraulic cross-line relief valves 68 are provided for safety. The speed of the pump 58 is controlled by the throttle 28, and the direction of flow of the hydraulic fluid is controlled by the valves 66 upon actuation of the valve 29.

When the motorcycle 11 of this invention is used, the engine 56 is actuated. Operation of the throttle 28 controls the pump 58, and hydraulic fluid is supplied to the motors 67. The valve 29 is actuated to control the direction of fluid flow to the motors 67 and thereby to cause the motorcycle 11 to be powered in a forward direction or a rearward direction.

Both wheels 23 are powered by a motor 67, and the thrust and the traction provided by each wheel 23 is the same. Additionally, both wheels 23 are employed in steering the motorcycle 11, the tie rods 24, 26 causing the front and rear wheels 23 to be turned in opposite directions, but in equal degrees, from the straight position. The wheels 23 are therefore self-tracking. The combination of both wheels 23 being powered and being used for steering, together with the aforementioned self-tracking characteristic, provide for a motorcycle 11 which is highly maneuverable and which corners well and with great stability. Since the wheels 23 share both the power and steering functions, it is harder for one wheel 23 to upset the functioning of the other wheel 23, or for one function to upset the operation of the other function. A more stable motorcycle 11 results. The self-tracking characteristic of the steering mechanisms of the motorcycle 11 provide for increased traction and greatly facilitate travel of the motorcycle 11 through adverse weather conditions, such as snow and rain, where the first wheel 23 can provide a clearer track for the second wheel 23. Where the valve 29 controls the motors 67 to drive the motorcycle 11 in a backwards direction, the aforementioned characteristics allow the motorcycle 11 to be balanced easily while traveling backwards.

The cover 13 facilitates travel by the motorcycle over rough terrain. The air cavity 54 is somewhat pressurized, air being drawn into the cavity 54 by the fan of the engine 56. The air passes between the supports 51, under the seat 52, through the apertures (not shown) in the top portion 37, and through the cowl and ductwork 56a into the cavity 54. Since the air is expelled from the cavity 54 through the aperture formed by the well members 34, 36 and sides 38, water and other foreign substances cannot easily enter the cavity 54 from beneath the motorcycle 11. The motorcycle 11 therefore may travel over rough terrain, and may ford substantial bodies of water such as streams having a two-foot depth, without stalling. The runner members 39 of the cover 13 further enable the motorcycle 11 to ford streams and travel rugged terrain by causing brush or water to skim underneath and additionally provide protection for the riders, especially with respect to legs and arms. Since the windshield 46 remains forward permanently, the rider is never exposed to the wind rushing by or to branches or other articles brushing by while turning, as is the case with a conventional motorcycle. Also, should a branch or other object strike the windshield 46, the motorcycle 11 could not be forced into a turn thereby, as is possible with a conventional motorcycle. For military applications, the cover 13 may be of an armored material, and the broad front portions 41 provide necessary protection. The use of a hydraulic drive 57 and the concealment of working parts by the cover 13 further facilitate the aforementioned usages of the motorcycle 11.

Insulation (not shown) may be used to line the air cavity 54. By varying the amount and type of insulation the noise of the motorcycle 11 may be muffled by various degrees appropriate for the particular use to which the motorcycle 11 is put. The insulation (not shown) is also variable to transmit different amounts of heat from the engine 56 through the seat 52 to the rider, as the weather and season require, to facilitate the comfort of the rider.

A length of 6 feet (about 183 cm) is preferred for the main frame members 16. Recessing the headlights 17 and tail lights 18 within the members 16 provides added protection therefor. The length of the seat 52 provides space for up to five riders, and the attaching rails 47 provide for the use of different types of rider and freight support structures, thereby increasing the versatility of the motorcycle 11.

The ratio of the sprocket 32 to sprocket 31 aids in preventing a sudden jarring of a wheel 23 by a rock or other obstruction from jerking the handle bar 27 from the hands of the operator of the motorcycle 11. The ratio of the sprockets 31, 32 also corrects for oversteering which might otherwise result since both wheels 23 are used for steering and steering is accomplished by only half the motion of the handle bar 27 as would otherwise be necessary. The use of both wheels 23 for steering enables the sides 38 of the cover to be no more than 16 to 18 inches (about 41 cm to 46 cm) apart, thereby enabling the motorcycle 11 to be enclosed yet still have a narrow body.

The cover mechanism 13 is removable as a unit, leaving the console 55 attached to the main frame members 16. The frame assembly 12 and drive mechanism 14 are thereby exposed and made easily accessible for servicing and repair.

It can be seen from the foregoing that the objects of this invention have been attained. Furthermore, although a preferred embodiment and some modifications thereto have been disclosed herein, it is to be remembered that various modifications and alternate constructions can be made thereto without departing from the full scope of the invention, as defined in the appended claims.

I claim:

1. A motorcycle having a frame carried at its front and rear ends respectively by front and rear wheel-bearing forks, and a power mechanism located beneath the frame and between the forks, the improvement comprising: front and rear fender well members rigidly attached respectively to the front and rear ends of the frame respectively ahead of and behind the power mechanism and each including an opening through which its respective fork extends, the front fender well member having a transverse wall extending downwardly behind the front fork and ahead of the power mechanism and the rear fender well having a transverse wall extending downwardly ahead of the rear fork and behind the power mechanism, means for covering the frame, said means embracing the frame from above and including a top portion extending between and joined to upper portions of the fender well members and overlying the power mechanism and opposite downwardly extending fore-and-aft portions joined to the top portion and disposed respectively at opposite sides of the frame and power mechanism, said side portions being also rigidly joined to the walls of the fender well members, said means as a whole combining with the fender well members to provide an air cavity opening downwardly directly to the ground intermediate the fender wells.

2. A motorcycle as defined in claim 1, including the further improvement of longitudinal running members rigidly attached respectively to the side portions of the means for covering and disposed closely above the ground, said side portions extending respectively ahead of and behind major portions of the front and rear forks to at least partially enclose the forks from the sides thereof, each running member extending laterally outwardly from its side portion and being continued past the lower portions of the fender well members.

3. A motorcycle as defined in claim 2, including the further improvement of a front edge rigid with each side portion and curving upwardly and forwardly alongside the front fork, a rear edge rigid with each side portion and curving upwardly and rearwardly alongside the rear fork, each running member having front and rear portions respectively coextensive with said front and rear edges.

4. A motorcycle having a frame and power mechanism, the frame having at each end thereof a wheel-bearing fork mounted, the frame further having at each end thereof fender well members attached, the fender well members extending toward each other and downwardly from the frame and having inwardly facing surfaces, the power mechanism being attached to the frame and resting between and upon the fender well members, the forks extending from the frame through the fender well members, wherein the improvement comprises:

means for covering, said means for covering resting upon said frame and draping over said frame, said means for covering abutting with the fender well members, said means for covering together with the fender well members thereby forming an air cavity, the power mechanism being disposed within said air cavity;

said means for covering including an elongated top portion, a pair of side portions, and a pair of running members, said top portion resting upon the frame and against the inwardly facing surfaces of the fender well members, each side portion depending from a longitudinal edge of said top portion, abutting longitudinal edges of the fender well members, and having a lower edge, each of said running members being attached to one of said side portions at said lower edge thereof;

both of said running members including central, rear and forward portions, said central portion disposed parallel to said top portion, said central portion at one end thereof having said rear portion contiguous therewith and at the opposite end thereof having said forward portion contiguous therewith, said rear and forward portions curving upwardly therefrom and toward said top portion, said forward portions curving upwardly above said top portion, said forward portions being interconnected above said top portion and resting upon said top portion;

the motorcycle having a windshield and said running members at the outwardly extended edges thereof each having a continuous bead formed, said forward portions where interconnected above said top portion having a groove formed therein, the windshield being received by said groove and beads, whereby a rigid protection is provided in front of those riding the motorcycle which protection remains directed forward regardless of the movement of the wheel-bearing forks.

* * * * *